(12) United States Patent
Chalk et al.

(10) Patent No.: US 8,764,122 B1
(45) Date of Patent: Jul. 1, 2014

(54) WHEEL LOCKING CAP WITH LIVE HINGES

(75) Inventors: Joseph A. Chalk, Warsaw, IN (US); Bruce E. Harrison, Warsaw, IN (US); Jeremy L. Howard, Claypool, IN (US)

(73) Assignee: Custom Engineered Wheels, Inc., Warsaw, IN (US)

(*) Notice: Subject to any disclaimer, the term of this patent is extended or adjusted under 35 U.S.C. 154(b) by 387 days.

(21) Appl. No.: 13/311,688

(22) Filed: Dec. 6, 2011

(51) Int. Cl.
*B60B 37/10* (2006.01)
*B60B 31/06* (2006.01)

(52) U.S. Cl.
USPC ............. 301/111.03; 301/111.07; 301/112; 301/121

(58) Field of Classification Search
CPC ........ B60B 37/10; B60B 31/06; B65F 1/1473
USPC ............ 301/111.01, 111.03, 111.05, 111.07, 301/112, 120, 121, 122
See application file for complete search history.

(56) References Cited

U.S. PATENT DOCUMENTS

| | | | |
|---|---|---|---|
| 5,215,356 A * | 6/1993 | Lin | 301/111.07 |
| 5,716,107 A | 2/1998 | Parker et al. | |
| 5,902,018 A * | 5/1999 | Owen et al. | 301/111.04 |
| 6,280,001 B1 * | 8/2001 | Parker et al. | 301/112 |
| 6,328,320 B1 | 12/2001 | Walski et al. | |
| 6,508,518 B1 * | 1/2003 | Owen et al. | 301/111.03 |
| 6,637,835 B2 | 10/2003 | Morris | |
| 6,938,964 B2 * | 9/2005 | Flood et al. | 301/119 |
| 7,108,335 B2 | 9/2006 | Morris | |
| 7,445,297 B2 * | 11/2008 | Mercier et al. | 301/111.04 |
| 7,488,045 B1 * | 2/2009 | Wang | 301/37.33 |
| 8,444,228 B2 * | 5/2013 | Parker et al. | 301/111.04 |
| 8,579,383 B2 * | 11/2013 | Vogler et al. | 301/121 |

* cited by examiner

*Primary Examiner* — Kip T Kotter
(74) *Attorney, Agent, or Firm* — Botkin & Hall, LLP; Michael D. Marston

(57) ABSTRACT

A wheel retaining device is provided for axially retaining a wheel on an axle having a notch. The cap is adapted for being affixed to a wheel. One or more springs is affixed to the cap at a lateral edge. The springs have a first position wherein the distal ends are located radially outward from the lateral edge. The springs are bendable into a second position wherein the springs are adjacent to the inboard side of the outer plate so that distal ends are urged inward. The distal ends include a protrusion that is adapted for being received in a notch on the axle. The cap is held onto the wheel by tabs that extending into apertures and catching behind the apertures. The cap is designed for maintaining the lateral position of the axle with respect to the wheel to which it is attached.

8 Claims, 11 Drawing Sheets

WHEEL LOCKING CAP WITH LIVE HINGES

BACKGROUND OF THE INVENTION

Wheels for small vehicles such as garbage cans, yard carts, or other carts should be easy to install, and easy to remove, but not too easy to remove. Typically, wheels are installed in such a way as to be nearly permanent without the use of special tools to remove the wheel. Some wheels use a one way cantilevered catch having a protrusion that is chamfered in the direction of installation and sharp on the direction to pull the wheel off. The chamfer catches in a notch near the end of the axle. To remove such a wheel one would need a screwdriver or other object to pull the catch outward to remove the wheel. The use of cotter pins may also secure a wheel, but again requires a tool to remove the wheel. The use of a cotter pin is an example of a wheel being too difficult to install as it requires one to bend a cotter pin that may break if a wheel is repeatedly installed and removed. A cantilevered catch is a little too easy to remove as it only requires a screwdriver, giving nearly everyone the ability to take off the wheel. A tool that is specific to the wheel itself, yet simple as a requirement for removal would be helpful to discourage vandals from removing wheels from garbage cans.

Typically, aside from wheels, garbage cans are shaped so they can be nested within each other. If wheels can be easily removed, the cans could be stacked in a small space, with the wheels being stored in the innermost can. Upon delivery to its final location, the wheels could be installed on the can. Easily changeable wheels would also make maintenance simple. Modern plastic garbage cans are usually tough enough to take many years of abuse. However, protruding wheels are vulnerable to damage or wear as the moving part of the can that supports the weight of the can and its contents. If a wheel becomes damaged throughout the life of a garbage can, the entire can does not have to be replaced. A replacement wheel or wheels, with simple instructions, could be shipped and installed on the garbage can, possibly even by an end user of the garbage can, provided the process for changing a wheel is simple.

SUMMARY OF THE INVENTION

The present invention is a device for retaining a wheel on an axle having a notch. Vehicles using this type of wheel may include but are not limited to garbage cans, storage bins, carts for yard work, appliance carts such as generators, and lawnmowers. The cap of this invention is adapted for being affixed to a wheel. The cap has an outer plate having a lateral edge, an inboard side adapted for facing a wheel and an outboard side. Springs are affixed to the outer plate at opposite portions of the lateral edge and the springs terminate at a distal end. The springs are opposed to each other on the outer plate. The springs have a first position wherein the distal ends are located radially outward from the lateral edge. The springs are bendable into a second position wherein the springs are adjacent to the inboard side of the outer plate so that distal ends are opposingly facing each other. The distal ends include a protrusion that is adapted for being received in a notch on the axle. The cap is held onto the wheel and this may be done by tabs that extend into apertures and catch behind the apertures. It is contemplated that this can be done using a rotational key slot and mating tab with a relatively larger end, or a snap fit hook type connection wherein the hooks are bent radially inward upon insertion into the apertures, then spring outwardly after having passed through the apertures in the wheel. The cap is designed for maintaining the lateral position of the axle with respect to the wheel to which it is attached.

DETAILED DESCRIPTION OF INVENTION

Figure 1:
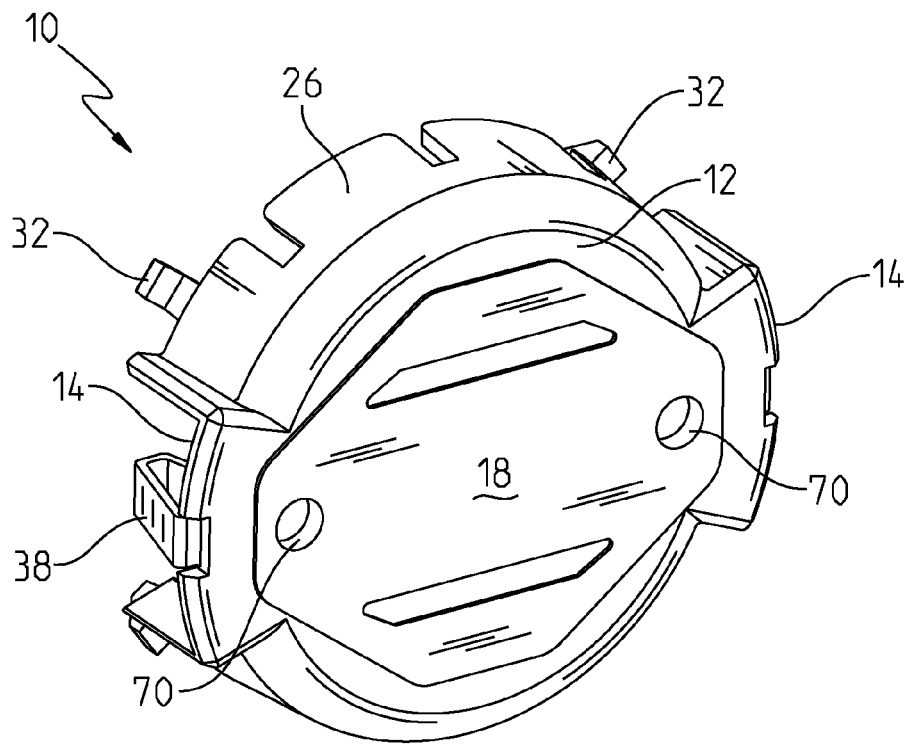
FIG. 1 is a perspective view of the cap of this invention with the springs folded adjacent the inboard side of the outer plate in their second position.
Figure 3:
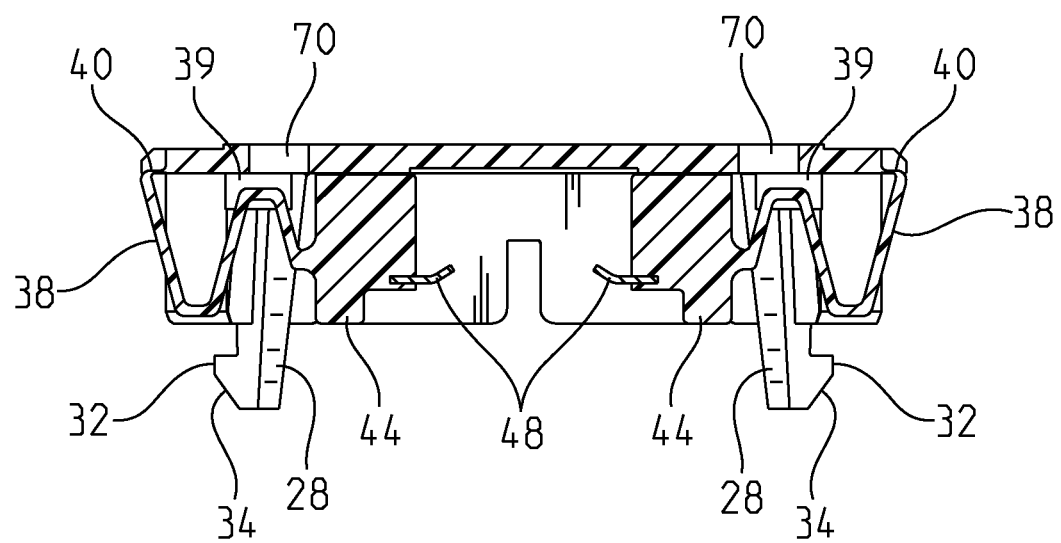
FIG. 3 is a sectional view of the cap shown about the line 3-3 in FIG. 2.
Figure 4:
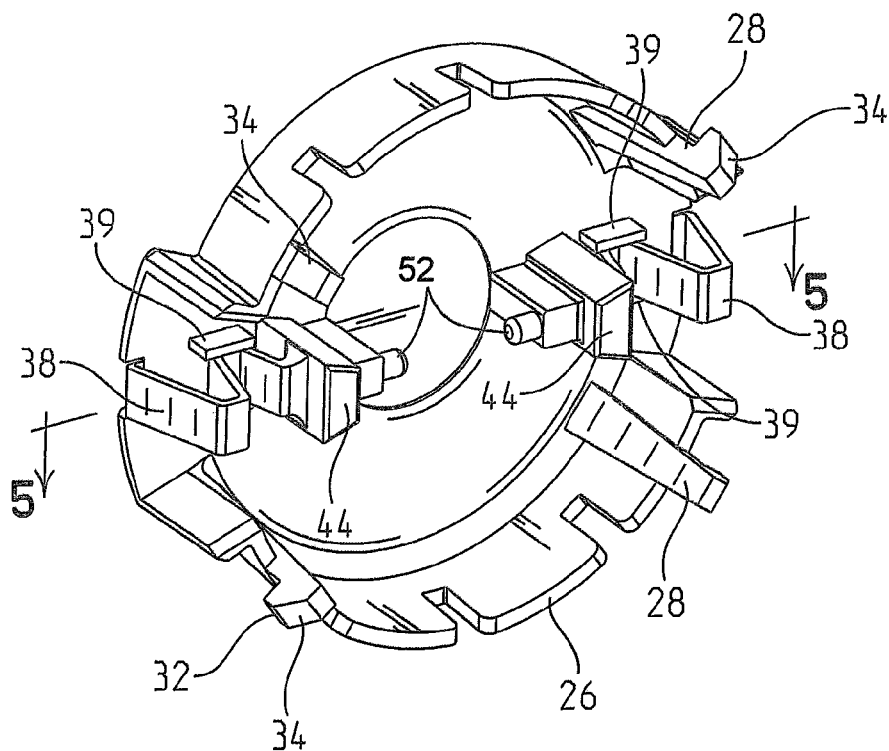
FIG. 4 is a back side perspective view of the cap having pegs molded into the sliding blocks with the springs folded adjacent the inboard side of the outer plate in their second position.
Figure 9:
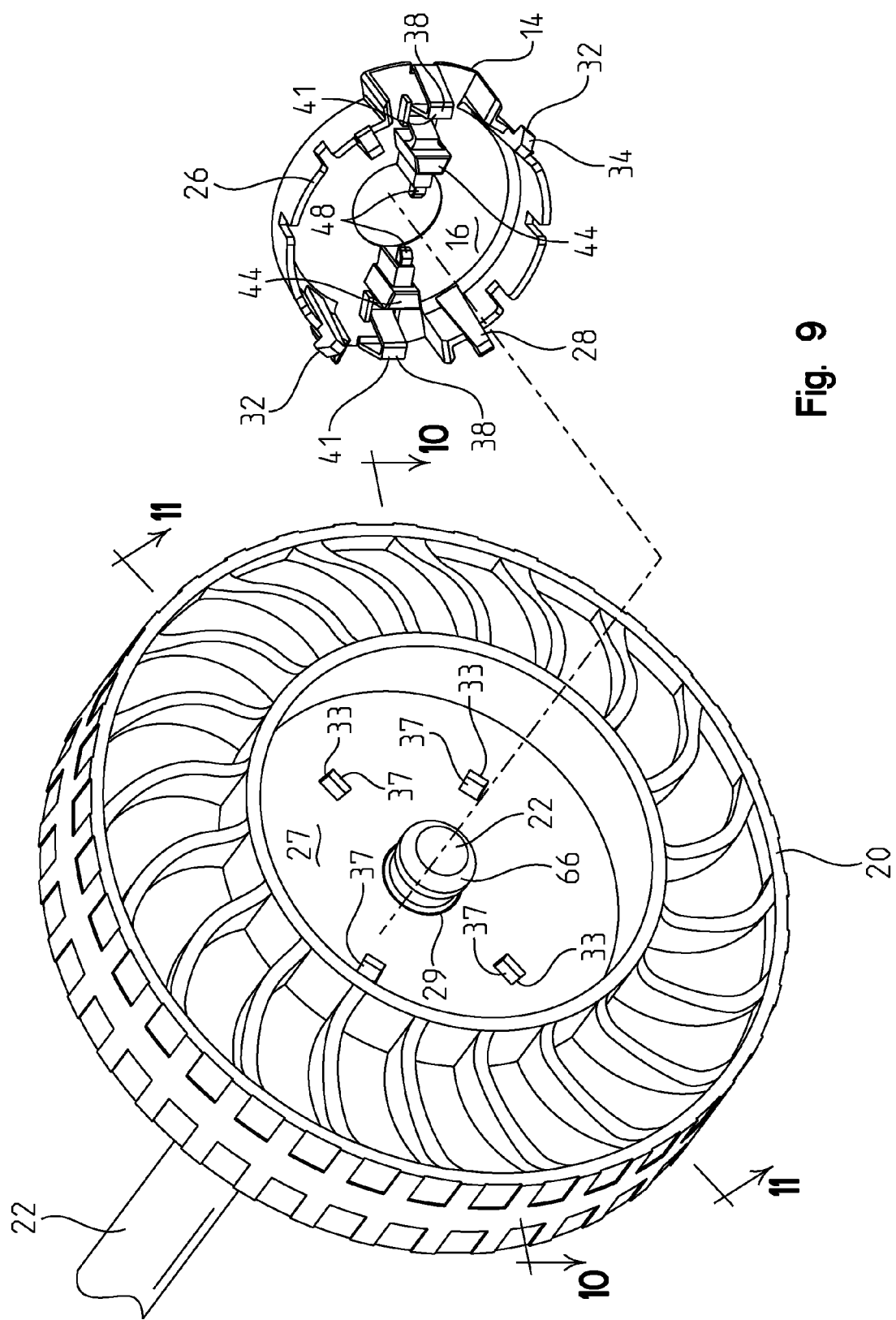
FIG. 9 is an exploded view of the cap of FIG. 6 as to be assembled with a wheel and axle.
Figure 11:
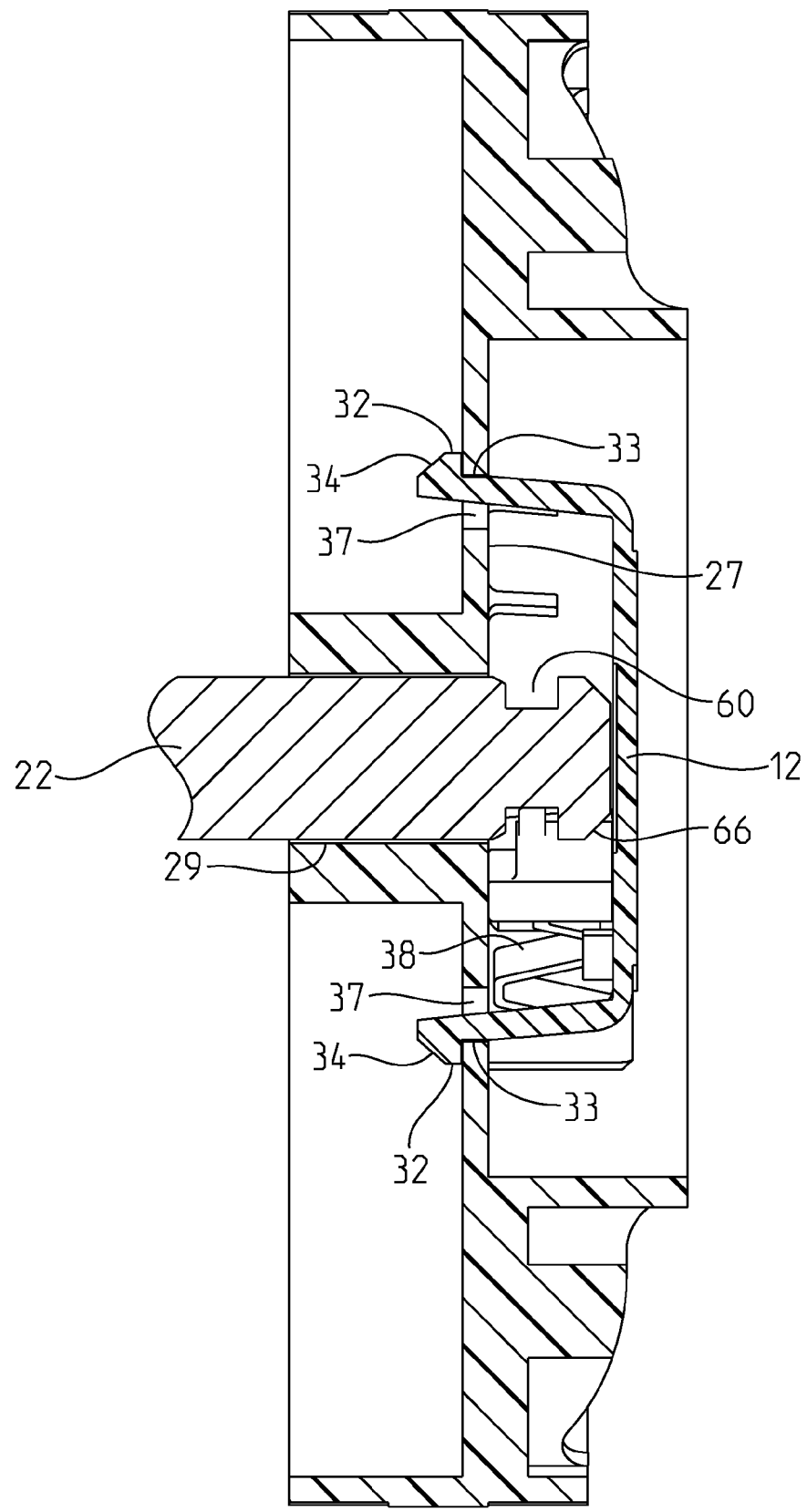
FIG. 11 is a sectional view taken about the line II-II in FIG. 9.
Figure 15:
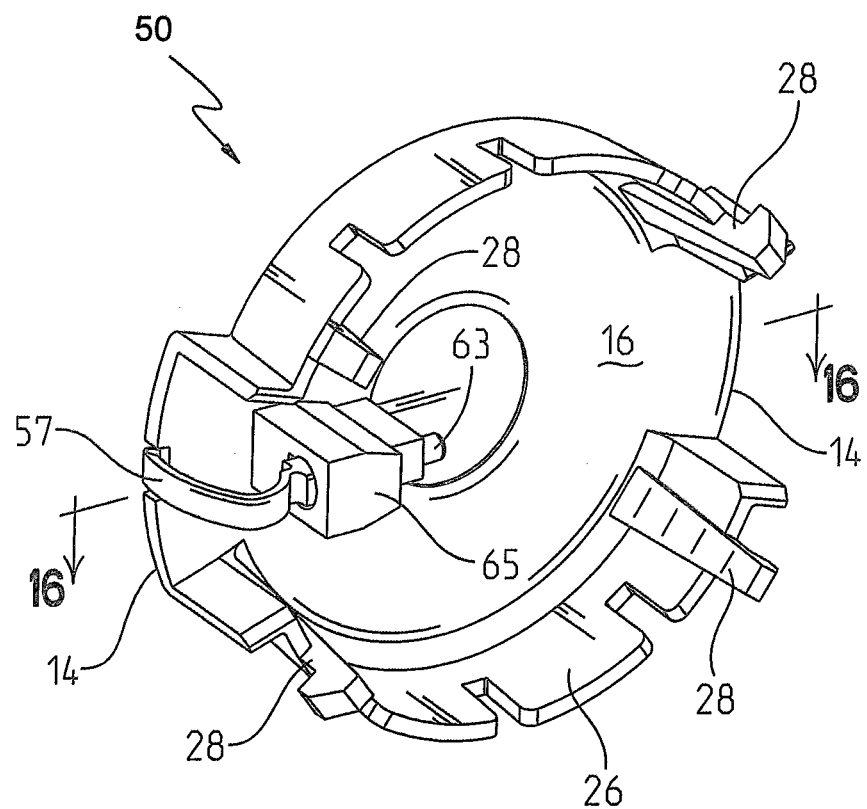
FIG. 15 is a view of the inboard side of a single spring locking cap with the spring in its second position adjacent to the inboard side of the outer plate.
Figure 16:
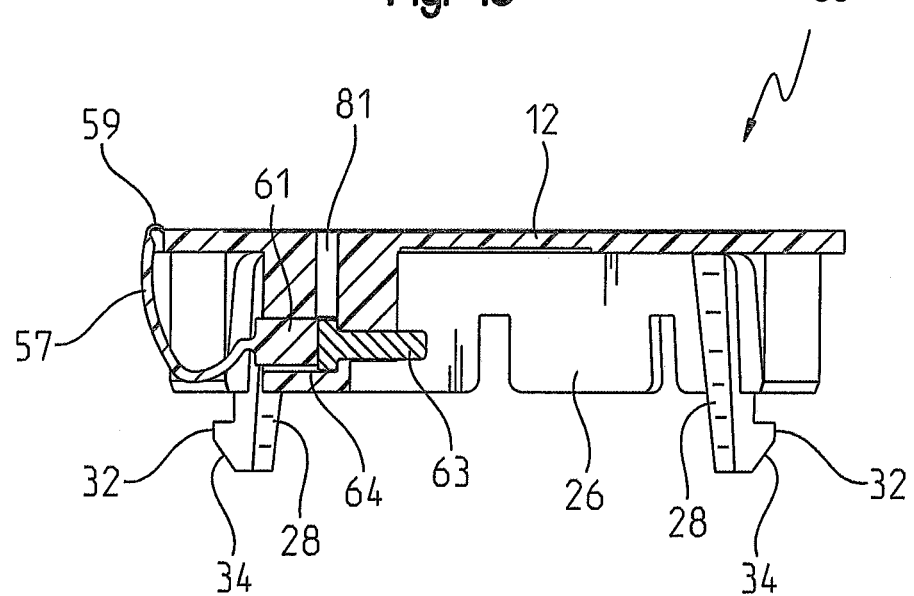
FIG. 16 is a sectional view of the locking cap of FIG. 15 taken about the line 16-16 in FIG. 15.
Figure 17:
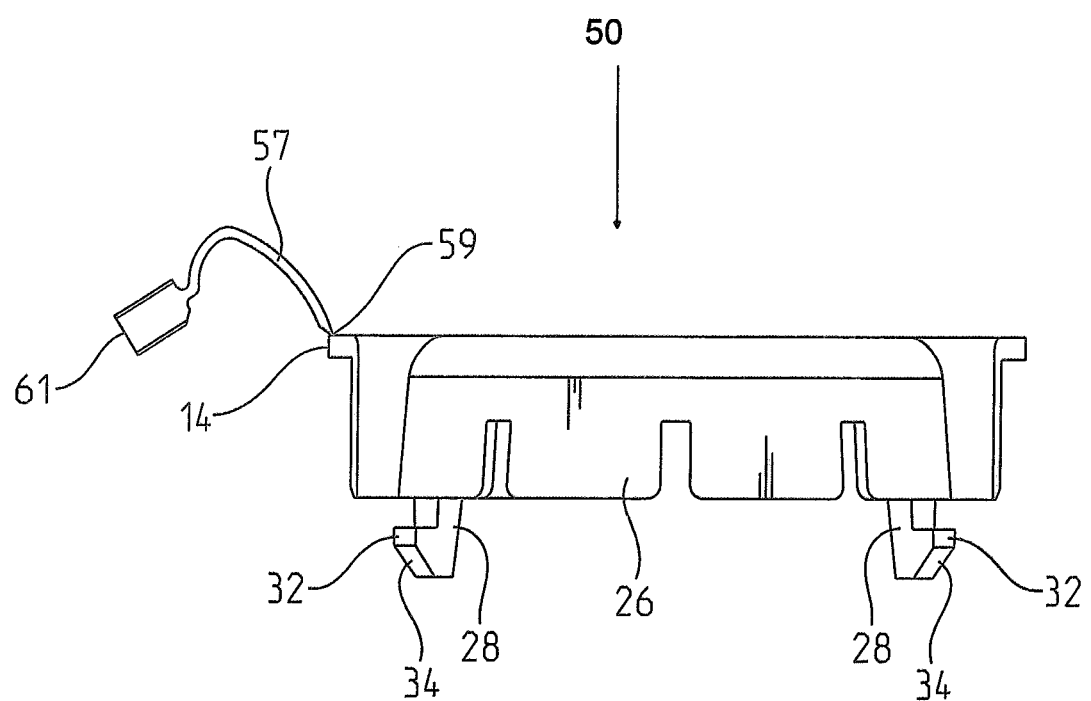
FIG. 17 is a side view of the locking cap of FIG. 15 with the spring in its first position with the distal end radially outward of the lateral edge.

The wheel locking cap 10 of the present invention is shown in FIGS. 1 and 3 in perspective. Another embodiment of the wheel locking cap 50 is shown in FIGS. 15-17. The locking cap 10 has an outer plate 12 with a lateral edge 14. The outer plate 12 has an inboard side 16 and an outboard side 18. The inboard side 16 is the side that will face a wheel 20 to which the locking cap 10 will be attached. The outboard side 18 will face outwardly from the wheel 20 and is opposite the inboard side 16. Generally, inboard shall refer to a direction facing toward an axle 22 that will be inserted into the wheel 20, and outboard will refer to a direction facing outwardly of the wheel and away from the axle 22. A sidewall 26 extends from the inboard side 16 of the outer plate 12. The sidewall 26 forms a stop on which the cap 10 will rest when it is installed on a wheel 20. Thus, the distance between a wheel 20 and a wheel hub surface 27 will be held a fixed distance apart because the sidewall 26 stops the outer plate from moving inboard. A wheel hub surface 27 is the surface of the wheel radially adjacent to where a bore 29 in which the axle 22 may extend through the wheel 20. The sidewall 26 is adapted for resting against the hub surface 27. The sidewall 26 has within it tabs 28 that extend beyond the sidewall 26. Each tab 28 is resilient and bendable toward the center of the cap 10. The tabs 28 are biased radially outward upon being bent inward. A hook 32 having a chamfer 34 is located at the end of each tab 28. The chamfer 34 is adapted for causing each tab 28 to bend inwardly when the tabs 28 are inserted into apertures 37 within the wheel 20. The apertures 37 are opposed to each other spaced radially away from the bore 29 in the hub surface 27 and extend through the hub surface 27 to the back, or inboard side of the wheel 20. As can be seen in FIG. 9, there are four apertures 37 being radially equidistant from the bore 29 and evenly spaced. The radially outermost edges 33 of the apertures 37 are spaced closer than the tips of the hooks 32. Therefore, when the hooks 32 are inserted into the apertures, the chamfers 34 will cause the hooks 32 to bend inward upon being inserted into the apertures 37. Then, upon passing through the apertures 37, the hooks 32 will resiliently spread radially outward so that the hooks 32 extend behind the hub surface 27 as shown in FIG. 11.

Figure 2:
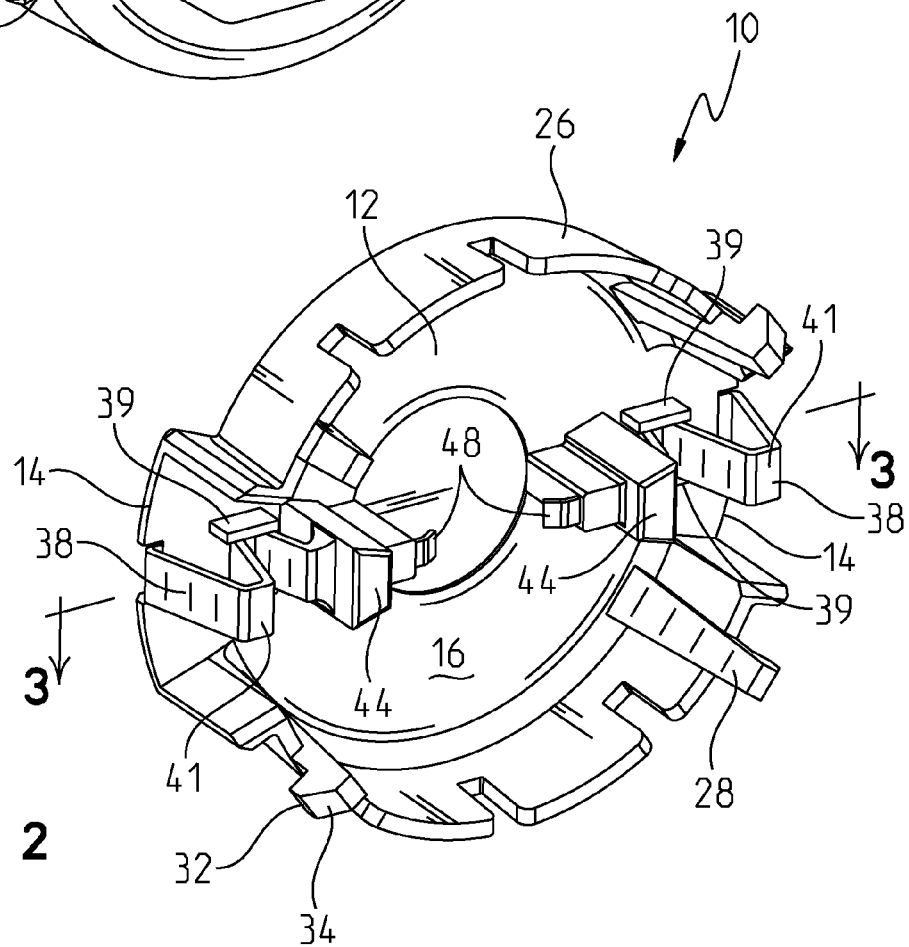
FIG. 2 is a perspective view of the cap in FIG. 1 from the opposite side of the cap as that in FIG. 1.
Figure 5:
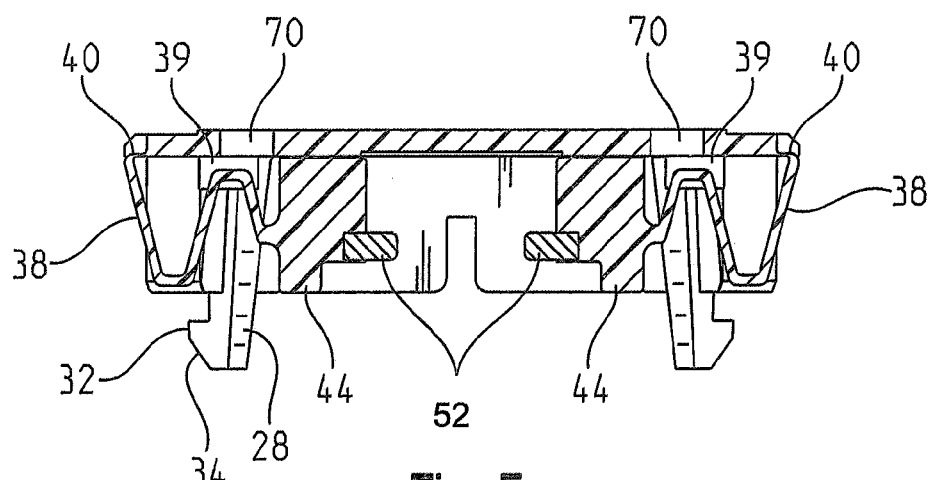
FIG. 5 is a sectional view of the cap shown in FIG. 4 about the line 5-5 in FIG. 4.
Figure 6:
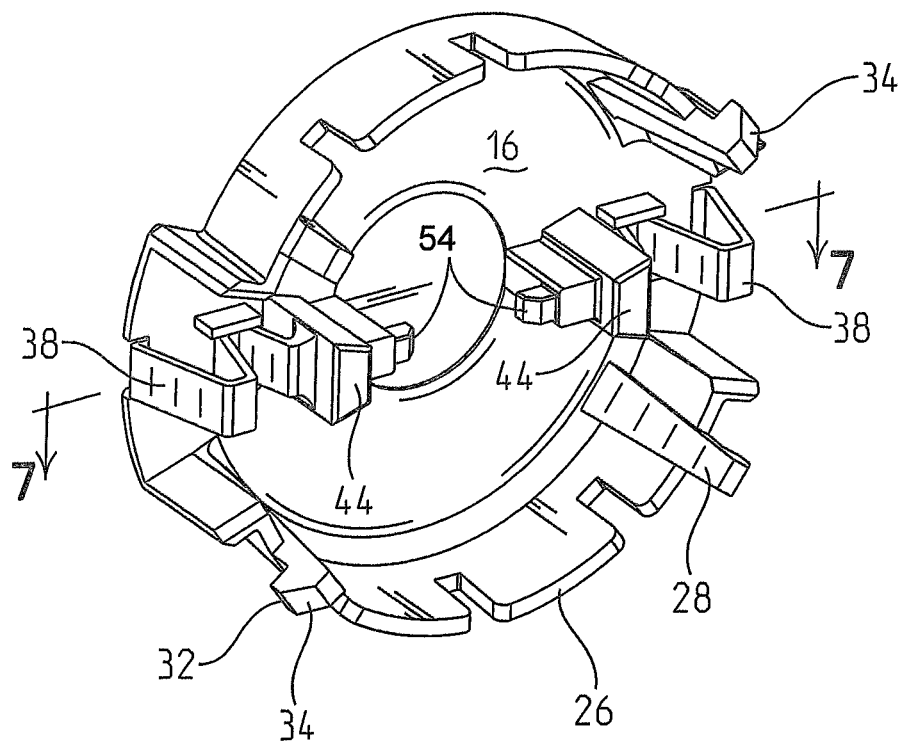
FIG. 6 is a back side perspective view of the cap having the protrusions integrally cast in the sliding blocks.
Figure 7:
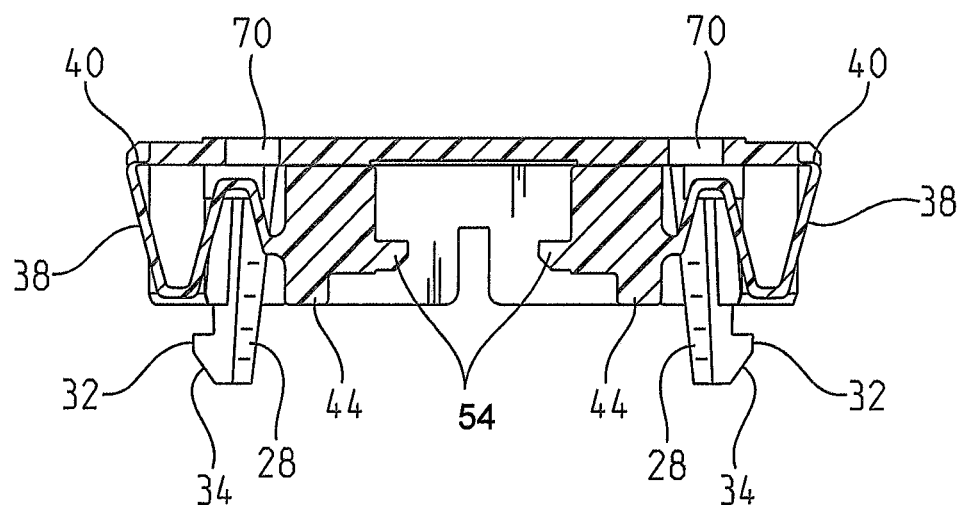
FIG. 7 is a sectional view of the cap taken about the line 7-7 in FIG. 6.
Figure 8:
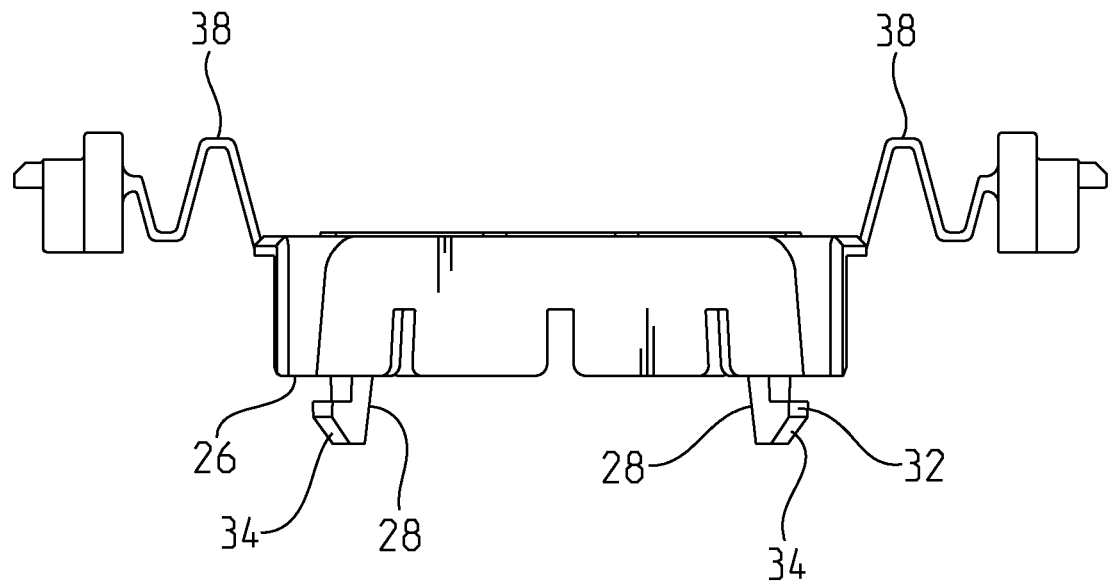
FIG. 8 is a side view of the cap shown in FIG. 6 with the springs in their first position extended radially outward of the lateral edges.
Figure 14:
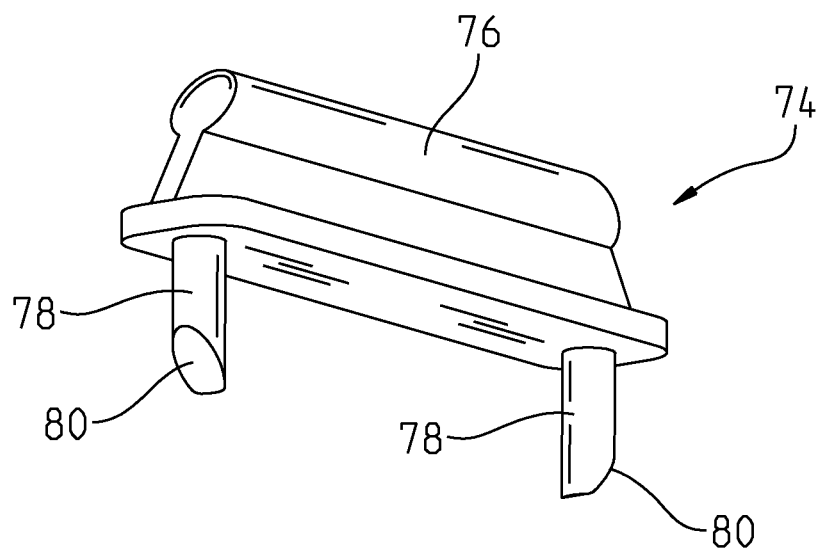
FIG. 14 is a perspective view of the removal tool shown in FIGS. 12 and 13.
Figure 10:
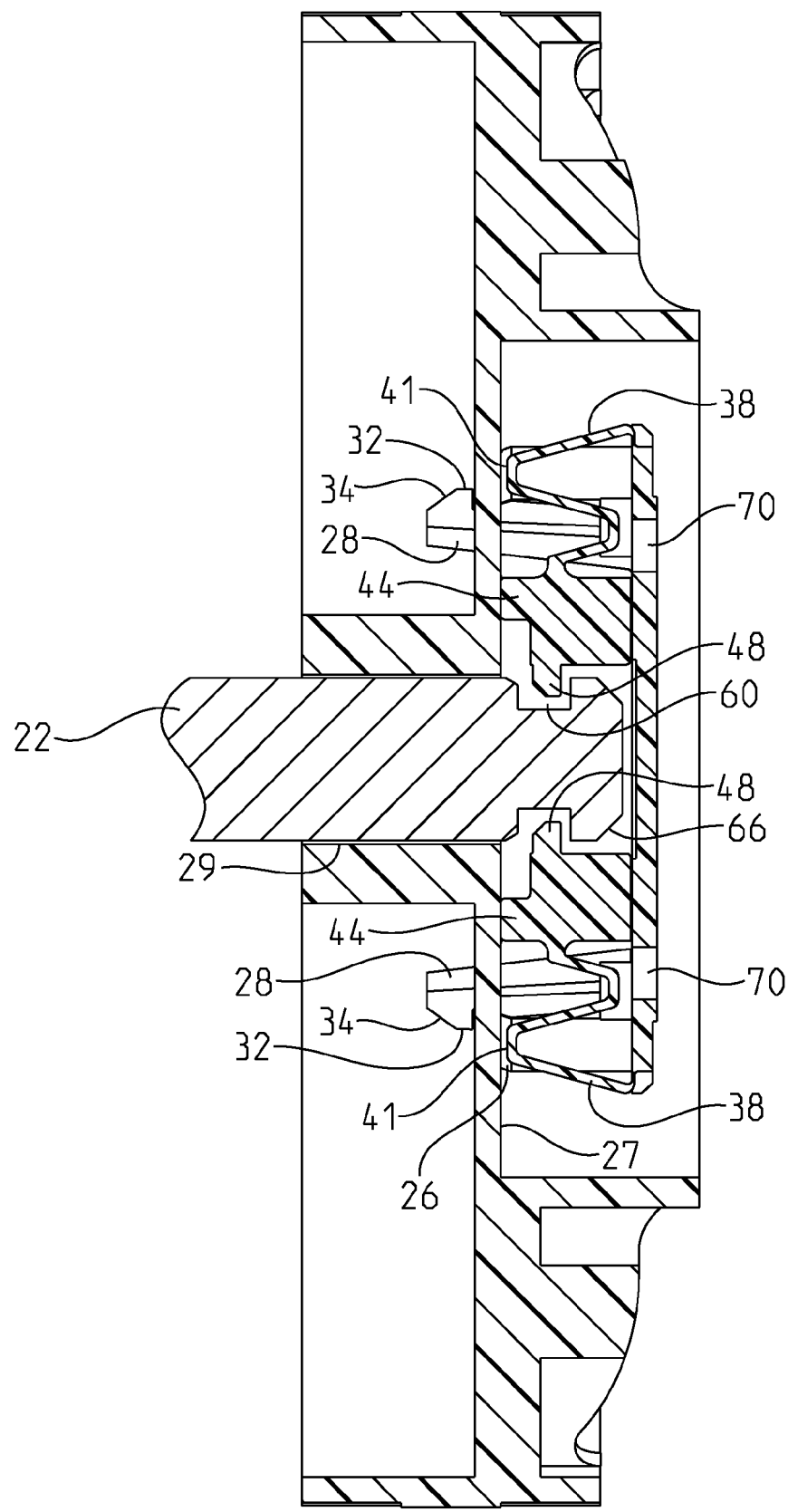
FIG. 10 is a sectional view of the cap of FIG. 6 as assembled onto an axle as taken about the line 10-10 in FIG. 9

Portions of the lateral edge 14 on opposite sides of the outer plate 12 can be seen in FIGS. 1 and 2. The sidewall 26 has gaps on opposite portions of the lateral edge 14. Integrally formed springs 38 extend from lateral edge 14 within the gaps. Typically the locking cap 10 is made of a polymer material that is injection molded. The springs 38 have a section 40 where they are connected to their corresponding portions of the lateral edge 14. The thinned section 40 is the thinnest part of the springs 38. Initially, the springs 38 are in a first position, as shown in FIG. 8, where the springs extend radially outwardly of the lateral edge 14. The springs 38 are designed to be bent into a second position so that they are adjacent to the inboard side 18 of the outer plate 12, as shown in FIGS. 1-7. The thinned section 40 is the only thinned section 40 within each spring so the springs 38 are easily folded into their second position. The thinned section 40 provides predictable bending at the lateral edge when bending the springs 38 from their first position into their second position. Each spring 38 is bent to have convolutes 41 that allow the spring 38 to flex linearly. The springs 38 are shown in their fully extended positions in FIGS. 1-7, while being in their second positions with respect to the cap 10. The springs 38 are opposed to each other in their second position, and if pushed radially outward, the springs 38 will bias the protrusions 48, 52, and 54 radially inward. Guides 39 on the inboard side 16 of the outer plate 12 ensure that the springs 38 move linearly when they are flexed in their second position. The guides 39 are raised rectangular ridges that straddle the springs 38 on both sides. Distal ends of the springs 38 have a sliding block 44 that includes a protrusion 48, 52, and 54. The sliding blocks 44 are almost the same height as the sidewall 26 with respect to the inboard side 16 and are slightly shorter to provide clearance between the hub surface 27 and inboard side 16 of the outer plate 12 when the cap 10 is installed on the wheel 20. The sidewall 26 ensures that the inboard side 16 of the outer plate 12 is held apart from the hub surface 27 a distance equal to the height of the sidewall 26 with respect to the inboard side 16. This will allow the sliding blocks 44 to slide linearly between the hub surface 27 and inboard side 16 of the outer plate 12 when the cap 10 is installed on a wheel as shown in FIG. 10. The protrusions 48 extend inward and oppose each other as shown in FIG. 2. The protrusions 48, 52, and 54 may be made in various ways. The protrusions 48 shown in FIG. 2 are metal tabs that extend inwardly and are integrally molded within the plastic making up the sliding blocks 44. The protrusions 52 shown in FIG. 5 are metal dowel pegs that are integrally molded into the plastic of the sliding blocks 44. The protrusions 54 shown in FIG. 6 are extensions of the plastic making up the sliding blocks 44, which enables the entire cap 10 to be cast as a single piece of plastic. The protrusions 48, 52, and 54 are adapted to be received within a notch 60 on an axle 22.

Another way of making a spring for a single spring version of the locking cap 10 is shown in FIGS. 15-17. In this the spring 57 extends from the lateral edge as shown in FIG. 15 and is bendable from a radially outwardly extending first position as shown in FIG. 17 to a second position shown in FIGS. 15 and 16. A single thinned section 59 acts as a hinge about the lateral edge 14 from which the spring is to be bent from its first position into its second position. In the second position a distal end 61 is located radially inward of the lateral edge 14 and the spring biases a separate plunger 63 radially inward. The plunger 63 acts in the same manner as the protrusions 48, 52, and 54 of the opposing springs 38; the plunger 63 is adapted to be received in the notch 60. The plunger 63 and distal end 61 of the spring 57 are guided by an aperture 64, in guide 65.

Figure 12:
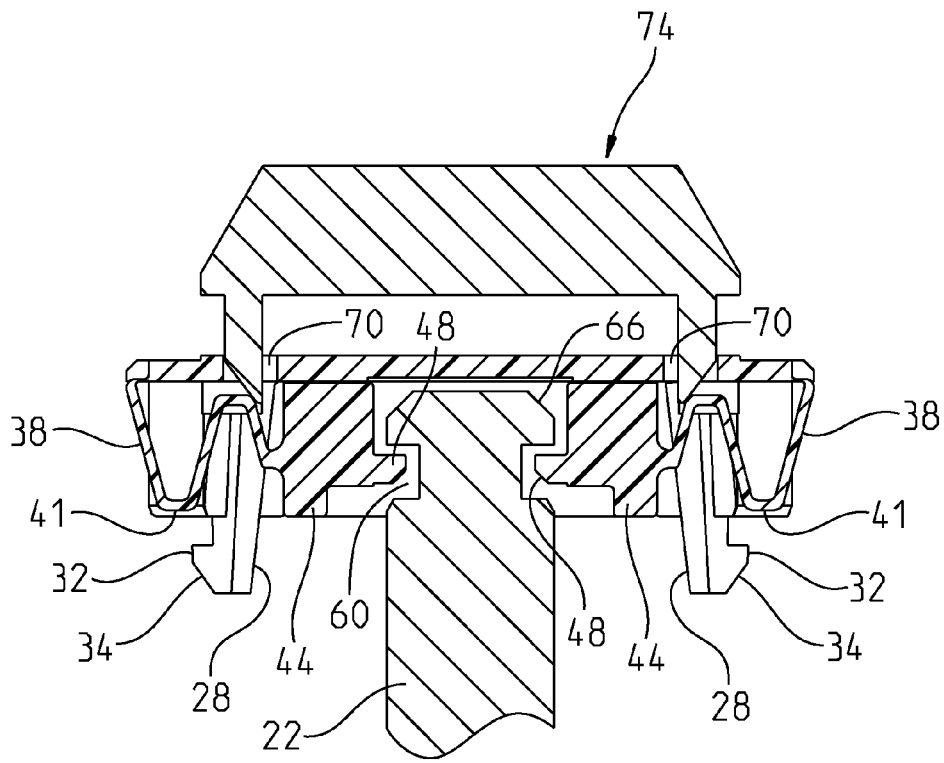
FIG. 12 is a sectional view of the cap shown in FIG. 6 with a removal tool partially inserted into the cap.
Figure 13:
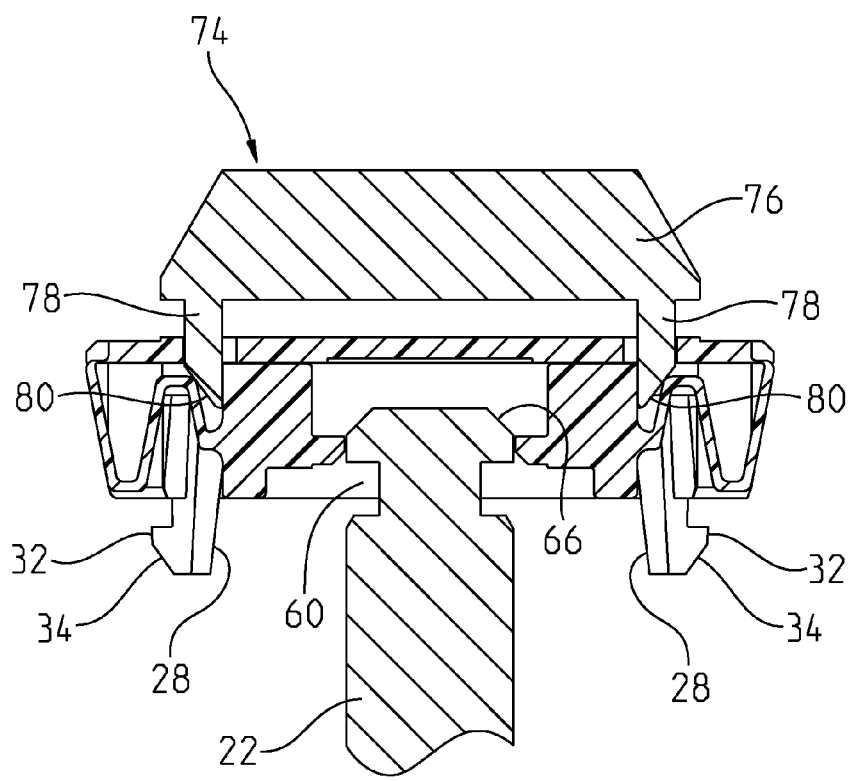
FIG. 13 is a sectional view similar to that of FIG. 12, with the removal tool fully inserted into the cap and retracting the springs.

The axle 22 has a chamfer 66 on its end that upon insertion between the protrusions 48, 52, and 54, pushes them apart. When axle 22 pushes the protrusions 48, 52, and 54 apart, the opposing springs 38 bias the protrusions 48, 52, and 54 toward the axle 22. The notch 60 is positioned so that when the biased protrusions 48, 52, and 54 are pushed into the notch 60, the end of the axle 22 touches the inboard side of the outer plate 12. The axle 22 is prevented and restrained from further axial movement because when the cap 10 is installed, hooks 32 prevent the cap 10 from being dislodged from the wheel 20. The axle 22 pushes the plunger 63 radially outward and the notch 60 receives the plunger in the same manner as the protrusions. It is contemplated that mechanisms other than the hooks 32 shown may be used to serve the catch function which prevents the cap 10 from falling off the wheel 20. Such other mechanisms will work properly if the mechanism prevents the axle 22 from pushing the cap 10 from the wheel. Retaining the cap 10 on the wheel 20 can be done using a rotational key slot and mating tab with a relatively larger end. When the protrusions 48, 52, and 54 extend into the notch 60 the axle 22 cannot back out of the notch 60 because the notch 60 has generally flat sides. To back the axle 22 out of the locking cap 10 the protrusions 48, 52, and 54 must be refracted from the notch 60. As can be seen in FIGS. 3 and 5, the outer plate 12 covers the springs 38 and sliding blocks 44. To permit access to the springs 38, holes 70 are located in the outer plate 12. The holes 70 are adjacent to the springs 38 and allow access of a wheel removal tool 74. The wheel removal 74 tool has a plastic or metal handle 76 that has two prongs 78 extending from it. The prongs 78 are round and fit within the holes 70 in the outer plate 12. The prongs 78 have chamfered ends 80 that are oppositely angled with respect to each other, as shown in FIGS. 12 and 13, the angles of the chamfers 80 slope upward toward the handle 76 traversing radially outward of the center of the cap 10. When the prongs 78 are inserted into the holes 70, they will engage the springs 38 and push them radially outward, thus, the protrusions 48, 52, and 54 will be refracted from the notch 60 and the axle 22 may be withdrawn from the cap 10. The refracted springs 38 are shown in FIG. 13.

In the case of the cap 10 shown in FIGS. 15-17, the outer plate 12 includes an access hole 81 that extends into the guide 65. A thin screwdriver or awl may be inserted into the hole 81 and can be used to retract the plunger 63 from the notch 60.

When a user of the locking cap 10 wishes to install the cap, he will first bend the springs 38 from the configuration shown in FIG. 8 so they are in their second position adjacent to the inboard side 16 as shown in FIG. 2. In the case of the cap 10 shown in FIG. 15, the spring 57 will be bent so the distal end 61 is inserted in aperture 64. The user will then push the cap 10 onto the wheel and insert the hooks 32 into apertures 37. The apertures 37, as shown in FIG. 11, extend through the hub surface 27 so that the hooks 32 catch behind the hub surface 27 and prevent the cap 10 from falling off of the wheel 20. The tabs being inserted into the apertures 37 also position the cap 10 so it is centered about the bore 29. With the cap 10 attached to the wheel, the user will then push the wheel 20 onto the axle 22. The chamfer 66 on the axle 22 will push the springs 38 and protrusions 48, 52, and 54 apart. The plunger 63 will push the distal end 61 of spring 57 radially outward as the plunger 63 rides over the chamfer 66. Once the wheel is on the axle 22, the protrusions 48, 52, and 54 or plunger 63 will remain seated within the notch 60. When a user of the locking cap 10 of FIGS. 1-7 wishes to remove the wheel 20, he will insert the removal tool 74 into the holes 70. When the prongs 78 extend into the holes 70, the prongs 78 will urge the springs 38 apart and retract the protrusions 48, 52, and 54 from the notch 60. In the case of the cap 10 shown in FIG. 16, the user will insert an awl or screwdriver into hole 81 to retract the plunger 63 from the notch 60. It is also possible to remove the cap 10 shown in FIGS. 1-7 using awl or screwdriver to retract the springs 38, however, using the removal tool 74 is much more convenient.

The invention is not limited to the details given above, but may be modified within the scope of the following claims.

What is claimed is:

1. A wheel locking cap for retaining an axle in a wheel wherein said axle has a notch, said locking cap comprising:
    an outer plate having a lateral edge, an inboard side adapted for facing said wheel, and an outboard side opposite said inboard side;
    a spring affixed to said outer plate and terminating in a distal end, said distal end including a protrusion adapted for being received in said notch, said spring having a first position wherein said distal end is located radially outward from said lateral edge, said spring being bendable into a second position wherein said spring is adjacent to said inboard side of said outer plate and said distal end is located radially inward of said lateral edge so that said spring biases said distal end radially inward.

2. A wheel locking cap as claimed in claim 1, wherein said outer plate includes a stop extending from said inboard side of said outer plate, said stop adapted for contacting said wheel to maintain said outer plate at a fixed distance from said wheel.

3. A wheel locking cap as claimed in claim 2, including tabs extending from said inboard side of said outer plate, said tabs being adapted for being received in apertures within said wheel.

4. A wheel locking cap as claimed in claim 3, wherein said tabs are resilient and oppositely located on said outer plate, said tabs including hooks extending radially outward such that said tabs must be bent inward to be inserted into said apertures, said tabs adapted for urging said hooks outwardly upon passing through said apertures.

5. A wheel locking cap as claimed in claim 4, wherein said outer plate includes holes adjacent to said springs when said springs are in their second position.

6. A wheel locking cap as claimed in claim 5 in wherein said holes are adapted for receiving an object for contacting and retracting said springs.

7. A wheel locking cap as claimed in claim 3, wherein guides extend from said inboard side of said outer plate, said guides being adjacent to said springs and adapted for guiding springs.

8. A wheel removal tool for use in combination with a wheel installed on an axle with a notch, said combination comprising:
    a locking cap having an outer plate with a lateral edge, an inboard side of said outer plate adapted for facing said wheel, an outboard side opposite said inboard side, opposing springs affixed to said outer plate and terminating in distal ends, said distal ends including a protrusion adapted for being received in said notch, said springs having a first position wherein said distal ends are located radially outward from said lateral edge, said springs being bendable into a second position, wherein said springs are adjacent to said inboard side of said outer plate and said distal ends are located radially inward of said lateral edge so that said springs bias said distal ends radially inward, said locking outer plate including holes adjacent to said springs when said springs are in their second position;
    said tool including a handle having prongs extending therefrom, said prongs having chamfered ends for engaging said springs and urging said distal ends radially outward.

* * * * *